United States Patent [19]

Ko et al.

[11] Patent Number: 5,355,227

[45] Date of Patent: Oct. 11, 1994

[54] LINEAR-PHASE FILTERING FOR PLAYBACK OF RECORDED FOLDED-SPECTRUM VIDEO

[75] Inventors: Jung W. Ko, Lawrenceville, N.J.; Christopher H. Strolle, Glenside, Pa.

[73] Assignee: SamSung Electronics Co., Ltd., Suwon, Rep. of Korea

[21] Appl. No.: 832,911

[22] Filed: Feb. 7, 1992

[51] Int. Cl.⁵ .............................................. H04N 5/76
[52] U.S. Cl. ................................... 358/335; 358/330
[58] Field of Search ............... 358/310, 335, 342, 105, 358/136, 138, 11, 330; 360/72, 33.1

[56] References Cited

U.S. PATENT DOCUMENTS

| | | | |
|---|---|---|---|
| 4,621,236 | 11/1986 | Reitmeier et al. | 358/141 |
| 4,772,961 | 9/1988 | Ichinoi | 360/9.1 |
| 4,831,463 | 5/1989 | Faroudja | 358/310 |
| 4,943,848 | 7/1990 | Fukinuki | 358/12.16 |
| 5,031,030 | 7/1991 | Hurst, Jr. | 358/12 |
| 5,063,457 | 11/1991 | Ishikawa et al. | 358/330 |
| 5,113,262 | 5/1992 | Strolle et al. | 358/310 |
| 5,161,030 | 11/1992 | Song | 358/310 |
| 5,187,590 | 2/1993 | Kim | 358/335 |
| 5,191,434 | 3/1993 | Kim | 358/335 |

OTHER PUBLICATIONS

Howson et al., Reduction of Television Bandwidth by Frequency Interlace, Jul. 1, 1959.
Research disclosure (anonymous).

Primary Examiner—Tommy P. Chin
Assistant Examiner—Robert Chevalier
Attorney, Agent, or Firm—Robert E. Bushnell

[57] ABSTRACT

An apparatus and a method for reproducing television images from recordings of folded-spectrum video signals uses a zero-crossing detector to convert an FM signal encoding folded-spectrum luminance signal to a PPM signal having the folded-spectrum luminance signal in its baseband, accompanied by the harmonics of the FM carrier and their respective sidebands. The PPM signal is digitized by an analog-to-digital converter, after passage through an anti-aliasing filter that is used to suppress only higher frequencies that would otherwise be sampled at less than Nyquist rate during digitization. Except for this anti-aliasing filtering, the suppression of the harmonics of the FM carrier and their respective sidebands is deferred until after digitization. Linear-phase digital filtering is then used to suppress the harmonics of the FM carrier and their respective sidebands, and the folded-spectrum luminance signal supplied in response to this digital filtering is unfolded to restore it to its original full bandwidth. This procedure permits the group delay characteristic below the folding-carrier frequency to be kept constant, thereby avoiding phase error as would interfere with the unfolding of the folded signal into the original full bandwidth.

18 Claims, 4 Drawing Sheets

FM CARRIER REJECTION FILTER

FIG. 3

ANTIALIASING FILTER (ANALOG)      NYQUIST LIMIT

FIG. 5

DIGITAL FIR FILTER    FOLDING POSITION

FIG. 6

LINEAR-PHASE FILTERING FOR PLAYBACK OF RECORDED FOLDED-SPECTRUM VIDEO

BACKGROUND OF THE INVENTION

The invention relates to an apparatus and a method for reproducing a video signal recorded on a magnetic tape using a bandwidth compression technique known as "frequency folding".

Recently, along with the development in digital picture processing techniques, there have been improvements of the resolution in the direction parallel to scan lines of video-tape-recorded images played back using conventional magnetic recording/playback apparatus. The luminance signal resolution is generally degraded by the limited recording bandwidth of the conventional household magnetic recording and playback machines such as a video cassette recorder (VCR) or a video tape recorder (VTR), owing to performance limitations of the recording/playback head and the tape. Accordingly, an improved VHS system called a super VHS (S-VHS) system was introduced, wherein improved image quality is secured by recording the video signal at full bandwidth using a frequency-modulated carrier wave that is higher than that used for standard VHS recording. An S-VHS recording cannot be played back on a standard playback system because of the frequency-modulated carrier wave being higher than that used for standard VHS recording.

The specification and drawing of U.S. Pat. No. 5,113,262 issued to C. H. Strolle, C. B. Patel, W. F. Wedam, J. W. Ko, R. Scnitzler and J. K. Yun on May 12, 1992 and entitled "VIDEO SIGNAL RECORDING SYSTEM ENABLING LIMITED BANDWIDTH RECORDING AND PLAYBACK" is incorporated herein by reference. In the system described therein a bandwidth compression technique known as "frequency folding" is used to record a video signal at full bandwidth on a recording medium having a limited bandwidth, and then, the originally recorded composite video signal is reproduced through playback from the recording medium. The recording made by this new system can be played back on a standard reproducing system without undesirable artifacts accompanying reproduced picture.

However, the previous invention of the inventors and others claimed in U.S. Pat. No. 5,113,262 has a shortcoming. The quality of the reproduced image is degraded because some portions of signal are attenuated or have a phase error. Such degradation is caused by lack of phase-linearity in the analog portion of the playback system. This gives rise to departures from linear-phase operation, in which the group delay characteristic is not constant over all frequencies of interest, and interferes with the unfolding of the folded signal into the original full bandwidth.

SUMMARY OF THE INVENTION

An aspect of the invention is a method for reproducing a full-bandwidth video signal from a frequency-modulation signal recorded in a recording medium, such as magnetic tape, which frequency-modulation signal is modulated in accordance with a folded-spectrum video signal of a type generated by the bandwidth compression technique of frequency folding the upper half of the frequency spectrum of said full-bandwidth video signal around a prescribed folding frequency so as to occupy the same band as the lower half of the frequency spectrum of said full-bandwidth video signal. The frequency-modulation signal is reproduced by playing back from the recording medium and is demodulated to generate a demodulation result. Only a low-pass component portion of the demodulation result is digitized, thereby to generate a first stream of digital samples occuring at a prescribed sampling rate. The low-pass component portion of the demodulation result is generated by anti-alias filtering in the analog regime, so as to suppress essentially only such high-pass component portion of the demodulation result as would otherwise give rise to aliases when digitizing at the prescribed sampling rate. The base band containing reproduced folded-spectrum video signal and a higher-frequency band containing other remnants of the frequency-modulated carrier wave survive the anti-alias filtering. The first stream of digital samples is digitally filtered, to generate a second stream of digital samples descriptive of a reproduced folded-spectrum video signal and substantially free of those other remnants of the frequency-modulated carrier wave the frequencies of which are above the band containing reproduced folded-spectrum video signal.

The invention in another of its aspects is embodied in apparatus suitable for performing the above method. The apparatus comprises analog reproducing means including a demodulator for demodulating the frequency-modulation signal played back from a recording medium to generate a demodulation result and an anti-aliasing filter operative in the analog regime for providing a low-pass response with a cut-off frequency somewhat below one-half a prescribed sampling rate. The apparatus further comprises digital reproducing means including an analog-to-digital converter for digitizing the low-pass response of the anti-aliasing filter supplied as an output signal from the analog reproducing means thereby to generate a first stream of digital samples occurring at the prescribed sampling rate, a digital filter for selecting from the first stream of digital samples a second stream of digital samples descriptive of a reproduced folded-spectrum video signal, and means for unfolding the reproduced folded-spectrum video signal to generate the reproduced full-bandwidth video signal.

DETAILED DESCRIPTION OF THE INVENTION

Figure 1A:
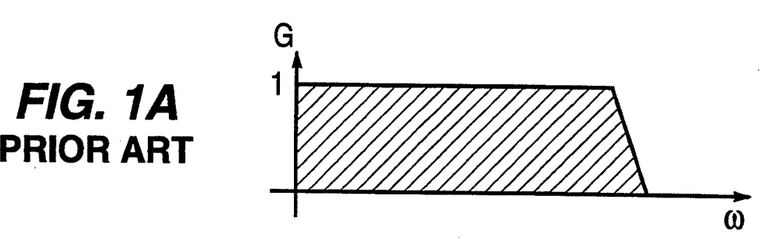
FIGS. 1A through 1K are views for illustrating methods for recording and playing back a full-bandwidth television image using a bandwidth compression technique described by the inventors and their coworkers in U.S. Pat. No. 5,113,262 issued on May 12, 1992 and entitled "VIDEO SIGNAL RECORDING SYSTEM ENABLING LIMITED BANDWIDTH RECORDING AND PLAYBACK". This bandwidth compression technique is prior art as against others and is accordingly labelled as "PRIOR ART", without any admission that this bandwidth compression technique is prior art as against the inventors.
Figure 1B:
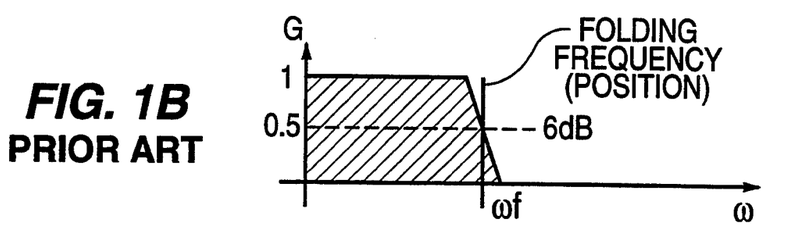
Figure 1C:
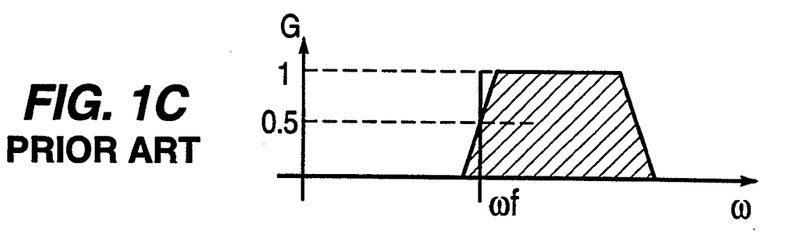

FIG. 1A illustrates the full-bandwidth frequency spectrum of an original signal to be recorded. U.S. Pat. No. 5,113,262 describes the division of this full-bandwidth frequency spectrum into a low-pass component and a high-pass component, which high-pass component is spectrum-folded about a folding frequency $\omega_f$ to generate a reversed subspectrum reposing in the same baseband subspectrum as the low-pass component. The division of the FIG. 1A spectrum into a low-pass component and a high-pass component is done using digital finite-impulse-response (FIR) filters that exhibit no differential phase offset between their respective −6 dB points at a cross-over frequency, which cross-over frequency is chosen to be at the folding frequency $\omega_f$. FIG. 1B shows the frequency spectrum of the low-pass component of the FIG. 1A signal extending upward from zero frequency through a −6 dB cross-over at the folding frequency $\omega_f$. FIG. 1C shows the frequency spectrum of the high-pass component of the original signal shown in FIG. 1A extending through a −6 dB crossover at the folding frequency $\omega_f$ and upward from the folding frequency car to the roll-off frequency of the original full-bandwidth frequency spectrum.

Figure 1D:
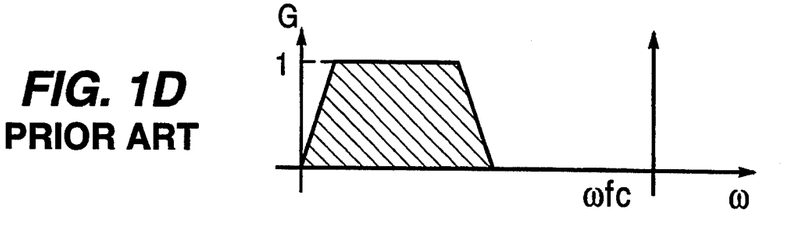
Figure 1E:
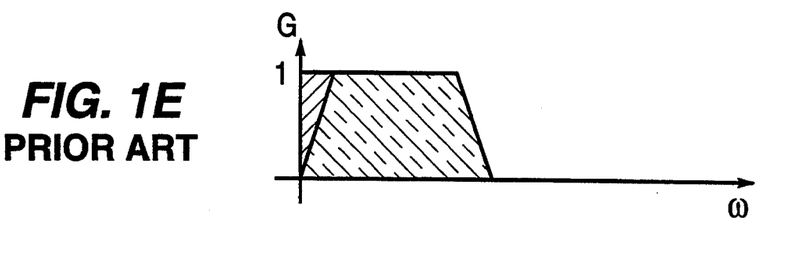

FIG. 1D illustrates the translation of the high-pass component to the low-frequency band accomplished by heterodyning that component with a carrier wave of folding carrier frequency $\omega_{fc}$ in a balanced modulation procedure, which generates the baseband reversed subspectrum as a lower sideband of the folding carrier frequency $\omega_{fc}$. This balanced modulation procedure also creates an image subspectrum as an upper sideband of the folding carrier frequency $\omega_{fc}$, which image subspectrum is suppressed by suitable filtering. The folding carrier frequency $\omega_{fc}$ is above the roll-off frequency of the original full-bandwidth frequency spectrum. FIG. 1E shows the folded spectrum formed by adding the low-pass component in FIG. 1B to the high-pass component translated to the low-frequency band in FIG. 1D.

The frequency-folded signal having the folded spectrum shown in FIG. 1E is used for modulating the frequency of a carrier wave over a frequency range from 3.4 to 4.4 MHz (+or −0.1 MHz), generating a spectrum occupying a 1.4–7.0 Mhz band, after filtering to suppress sideband energy below 1.4 MHz. The resulting frequency-modulation (FM) signal is recorded on a recording medium. During playback the FM signal is recovered from the recording medium and is then demodulated to reproduce the frequency-folded signal having the folded spectrum shown in FIG. 1E.

Figure 1F:
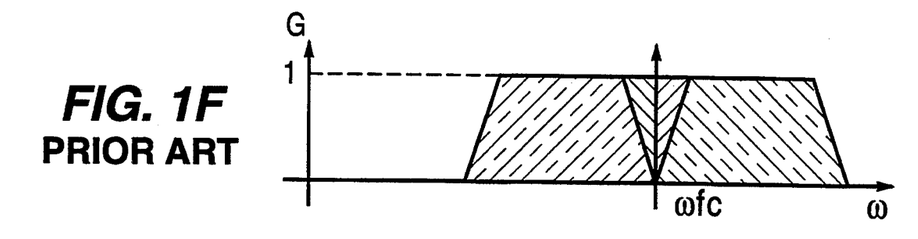
Figure 1G:
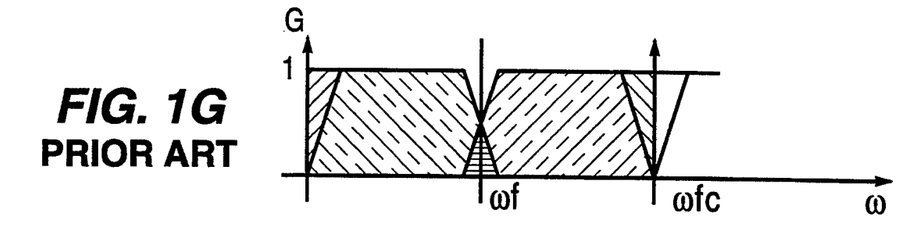
Figure 1H:
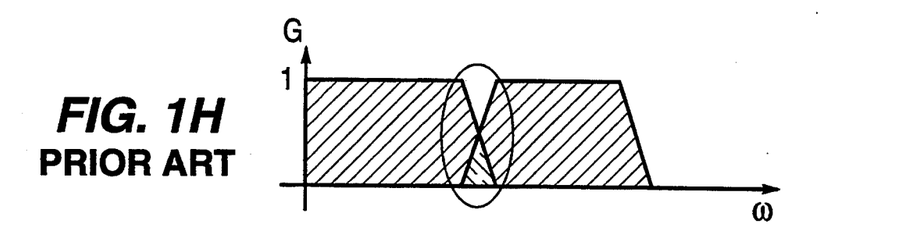

FIG. 1F shows the FIG. 1E folded spectrum translated to the original high-frequency band, which is done during playback by heterodyning the frequency-folded signal having the folded spectrum shown in FIG. 1E with a carder wave of folding carrier frequency $\omega_{fc}$ in the playback system. FIG. 1G shows the spectrum of the sum signal resulting from subsequently adding the frequency-folded signal of FIG. 1E to the frequency-translated signal of FIG. 1F. The resulting sum signal is passed through a comb-filter for suppressing aliases generated during the folding procedure, to generate a comb-filter response having a spectrum as diagrammed in FIG. 1H.

Figure 1I:
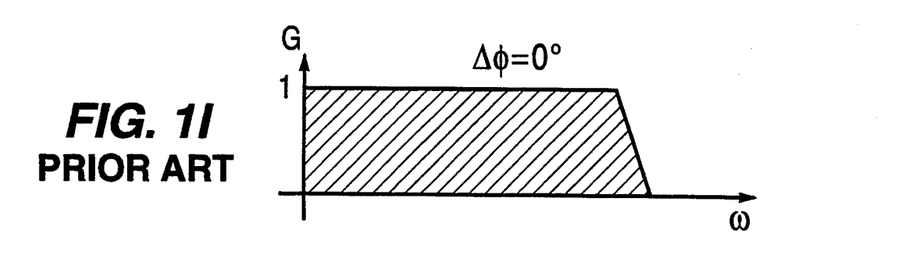
Figure 1J:
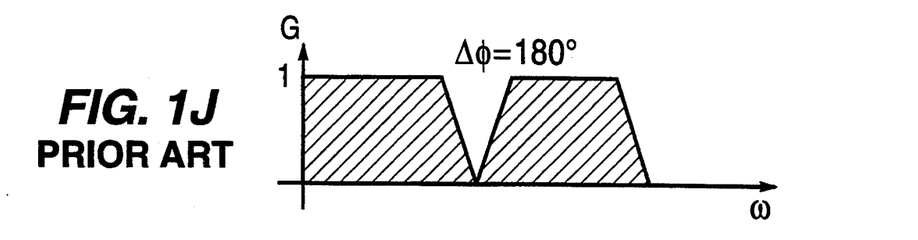
Figure 1K:
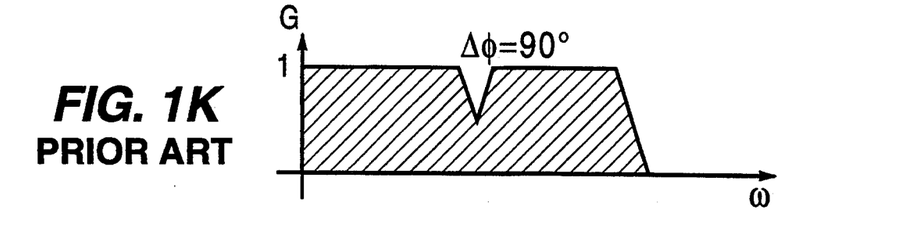

FIGS. 1I, 1J, and 1K show the frequency characteristics of the final reproduced output signal. In FIG. 1I the low-pass and high-pass components have no differential delay at their cross-over frequency $\omega_f$ while in FIGS. 1J and 1K the low-pass and high-pass components have differential delays of 180° and 90°, respectively, at their cross-over frequency $\omega_f$. In other words, during the folding and unfolding procedures, the full-band video signal can be precisely reconstructed during playback when the low-pass and high-pass components are of the same phase at their −6 dB cross-over frequency $\omega_f$. However, if there is differential delay between low-pass and high-pass components in the cross-over region, the two components cancel each other to some extent, so the desired flat amplitude response characteristic extending through the cross-over region is not obtained. Furthermore, there is a departure from the desired linear phase characteristic.

Figure 2:
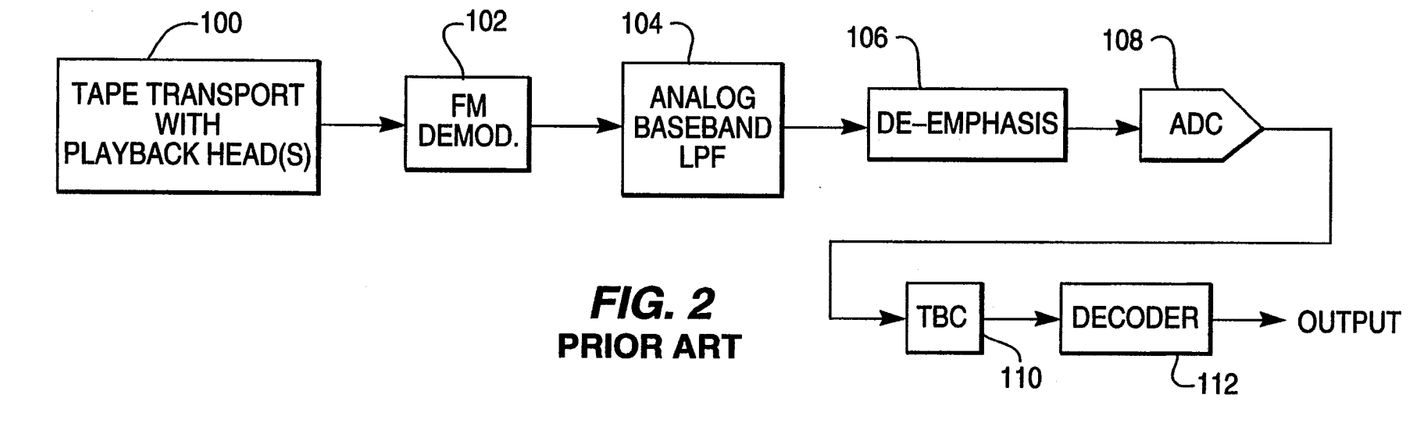
FIG. 2 is a block diagram showing apparatus used by the inventors and their co-workers for reproducing television images from recordings of folded-spectrum video signals in implementing the bandwidth compression technique described in U.S. Pat. No. 5,113,262. This apparatus is prior art as against others and is accordingly labelled as "PRIOR ART", without any admission that this apparatus is prior art as against the inventors.

FIG. 2 is a block diagram of the playback apparatus previously used by the inventors and their co-workers for reproducing television images from recordings of folded-spectrum video signals using frequency modulation (FM) of a prescribed carrier frequency. Except for a decoder 112 that unfolds the folded-spectrum video signals, the FIG. 2 playback apparatus is the same as that conventionally used in VHS recording of video signals that do not have a folded spectrum. During playback, a tape transport 100 with at least one playback head reproduces in electric signal form the frequency-modulation signal recorded as magnetic variations on a magnetic tape and demodulated by an FM demodulator 102. FM demodulator 102 provides its output signal to an analog low-pass filter 104. Filter 104 is a baseband filter that has a cut-off frequency of 2.5 MHz and responds to the folded-spectrum output signal of FM demodulator 102, but not the accompanying FM carrier harmonics and their respective sidebands. A de-emphasis circuit 106 de-emphasizes the emphasized portion of the low-pass filter 104 response to get a flattened response that is supplied to an analog-to-digital converter 108 for digitizing. A time-base correction circuit 110 corrects the time axis error of the digital signal from the converter 108, and the resulting time-base-corrected digitized signal is supplied to the decoder 112.

The FM demodulator 102 preferably is a zero-crossing detector, of a type detecting both positive-going and negative-going crossings of the average-value axis to generate a pulse-position modulation (PPM) signal. The PPM signal is low-pass filtered to suppress the harmonics of the FM carrier signal and their respective sideband structures. Because the zero-crossing detector is of the type detecting both positive-going and negative-going crossings of the average-value axis, the odd harmonics of the FM carrier signal and their respective sideband structures are suppressed compared to the even harmonics of the FM carrier signal and their respective sideband structures. Theoretically, then, it is the second harmonic of the FM carrier wave and its sidebands, rather than the fundamental of the FM carrier wave and its sidebands, that is the lowest-frequency component of substantial strength that must be suppressed. This can ease the problem of selecting the baseband and suppressing the harmonics of the FM carrier signal and their respective sideband structures. In practice, however, the fundamental of the FM carrier wave and its sidebands seldom are perfectly cancelled, so provision must be made for suppressing their remnants by filtering.

The unfiltered PPM signal generated by the FM demodulator 102 when it is a zero-crossing detector comprises a baseband component and harmonics of the FM carrier signal accompanied by respective sideband structures. To increase the proportion of baseband energy to the combined energies of the harmonics of the FM carrier signal and their respective sideband structures, the pulses detected at zero crossings are stretched in time, but not so much that one pulse interferes with the next. This pulse-streching also eases the problem of selecting the baseband and suppressing the harmonics of the FM carrier signal and their respective sideband structures.

Previously, the filtering of the PPM signal to suppress the harmonics of the FM carrier signal and their respective sideband structures has been done in the analog regime, using the analog low-pass filter 104 having a cut-off frequency of 2.5 MHz. The 2.5 MHz cut-off frequency of the analog filter 104 is below one-half the frequency of sampling by the analog-to-digital converter 108, so no anti-aliasing filter is required to avoid sub-Nyquist sampling by the converter 108 of the higher frequencies supplied thereto.

Figure 3:
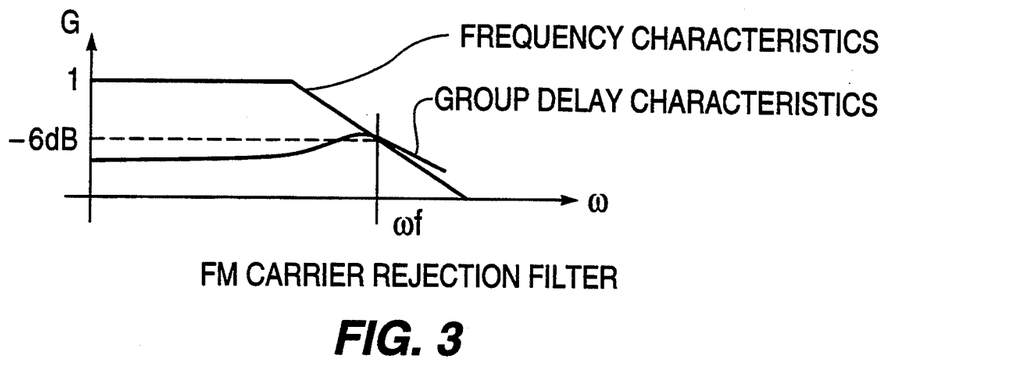
FIG. 3 shows the frequency and group delay characteristics of the analog low-pass filter in FIG. 2, which filter defines the baseband in which the folded-spectrum luminance signal is contained.

FIG. 3 illustrates how the analog filter 104 exhibits severely increased group delay in the region of its 2.5 MHz cut-off frequency. That is, there is delay is significantly greater than linear-phase delay in this region, which happens to coincide with the cross over region between the low-pass and high-pass components of the full-bandwidth frequency spectrum that are to be rejoined per the procedures illustrated by FIGS. 1F–1I. This delay causes the time-base-corrected digitized folded-spectrum luminance signal supplied to the decoder 112 to depart from the desired linear-phase characteristic in the region of the cross-over or folding frequency $\omega_f$ and to have excess delay over and above linear-phase delay in this region. This gives rise to defective full-bandwidth luminance signal reconstruction from folded-spectrum luminance, of the nature illustrated in FIGS. 1J and 1K.

Figure 4:
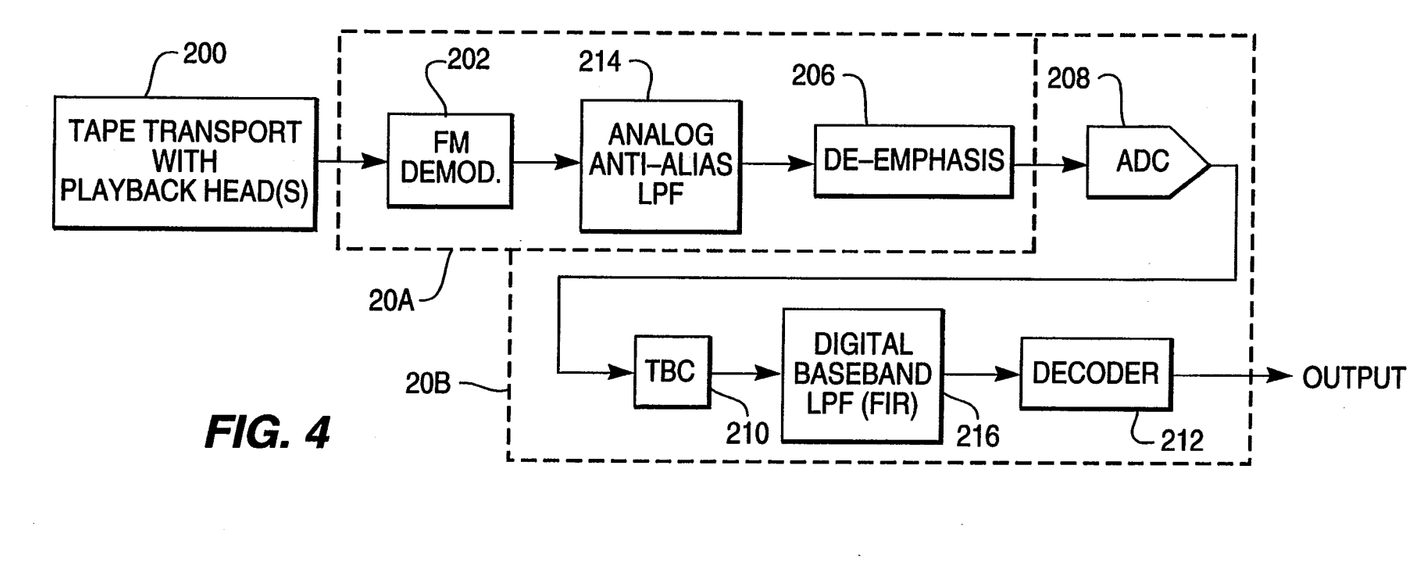
FIG. 4 is a block diagram showing an apparatus for reproducing television images from recordings of folded-spectrum video signals, which apparatus embodies the present invention.

FIG. 4 shows playback apparatus embodying the invention in one of its aspects, used to perform the method embodying the invention in another of its aspects as outlined above. Broadly considered, the FIG. 4 playback apparatus comprises a tape transport 200 with at least one playback head for reproducing in electric signal form the frequency-modulation signal recorded as magnetic variations on a magnetic tape, analog playback circuitry 20A, and digital playback circuitry 20B. The analog playback circuitry 20A includes an FM demodulator 202, a low-pass filter 214, and a de-emphasizing circuit 206. The digital playback circuitry 20B includes an analog-to-digital converter 208 which digitizes the output signal of analog playback circuitry 20A, a time-base correcting circuit 210, a digital low-pass filter 216, and a decoder 212. Elements 200, 202, 206, 208, 210, and 212 are substantially the same as elements 100, 102, 106, 108, 110, and 112 of FIG. 2.

The analog playback circuitry 20A demodulates the frequency-modulation signal supplied during playback and supplies the demodulated signal to the analog-to-digital converter 208 in the digital playback circuitry 20B. The low-pass filter 214 is an anti-aliasing filter having a cut-off frequency lower than one-half the sampling rate at which samples in a first stream of digital samples are provided by the analog-to-digital converter 208. The cut-off provided by the digital filter 214 avoids sub-Nyquist sampling by the converter 208 of the higher frequencies supplied thereto. Thus there is no generation of aliases by the converter 208. Any harmonic of the FM carrier and their respective sidebands not suppressed by the anti-aliasing filter 214 are components of samples in the first stream of digital samples supplied by the analog-to-digital converter 208 to a digital low-pass filter 216. The response of the digital low-pass filter 216 is a second stream of digital samples in which the harmonic of the FM carrier and their respective sidebands have been suppressed. This second stream of digital samples is descriptive of a reproduced folded-luminance signal and is supplied to a decoder 212. The decoder 212 carries out the unfolding procedure outlined above to reproduce a luminance signal of the original full bandwidth.

Figure 5:
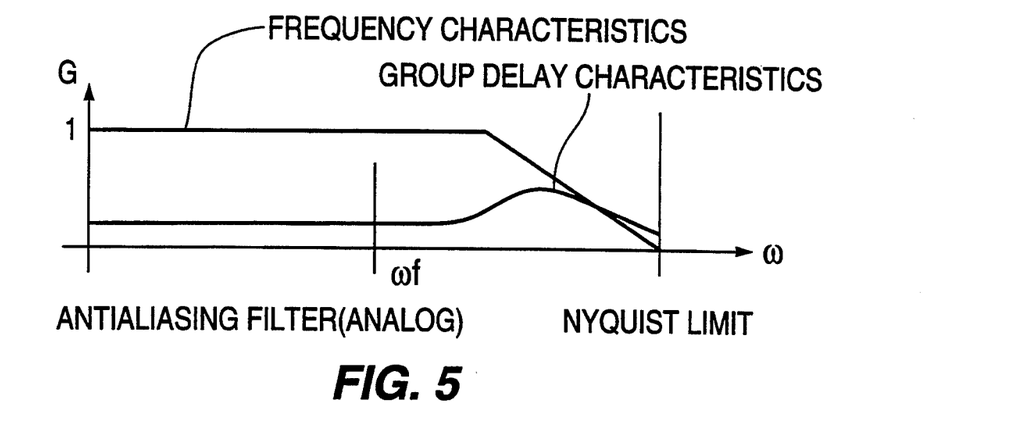
FIG. 5 shows the frequency and group delay characteristics of the analog low-pass filter in FIG. 4, which filter is an anti-aliasing filter included before the analog-to-digital converter.

FIG. 5 shows that the low-pass, anti-aliasing filter 214 has a constant group delay characteristic at frequencies before the −3 dB cut-off of filter 214 is approached, which frequencyies extend up to and somewhat past the folding frequency $\omega_f$. In a preferred embodiment of their invention the inventors have chosen a folding frequency $\omega_f$ of 2.55 MHz, which is one-half the folding carrier frequency $\omega_{fc}$. The folding frequency $\omega_f$ is one-quarter the 10.2 MHz sampling rate of the analog-to-digital converter 208, which is sampling rate is 640 times NTSC-standard line scan frequency.

The −3 dB corner frequency of the filter 214, which is constructed with a single limited-Q series-arm inductor and a single shunt leg capacitor, has been placed at 4 Mhz. The filter 214 passes the 0–2.55 MHz band containing the folded-spectrum luminance signal in the substantially linear-phase, lower-frequency portion of its response. Assuming the frequency of a carrier wave is varied over the frequency range from 3.4 to 4.4 MHz (+ or −0.1 MHz), the filter 214 also passes (to the extent that they exist) the lower sideband of the FM carrier wave fundamental, the FM carrier wave fundamental itself, and vestigial amounts of the upper sideband of the FM carrier wave fundamental. These remnants of the FM demodulation process have frequencies that extend through a region of the filter 214 response that has a substantial hump in the group delay characteristic (i.e., that exhibits a substantial departure from the desired linear-phase delay), but these remnants of the FM demodulation process are to be removed in the digital regime by the digital low-pass filter 216. Since these remnants of the FM demodulation process are suppressed to relatively very low levels in the response of the digital low-pass filter 216, the phasing of these remnants of the FM demodulation process is of no consequence to the unfolding of the folded-luminance signal in the decoder 212.

Figure 6:
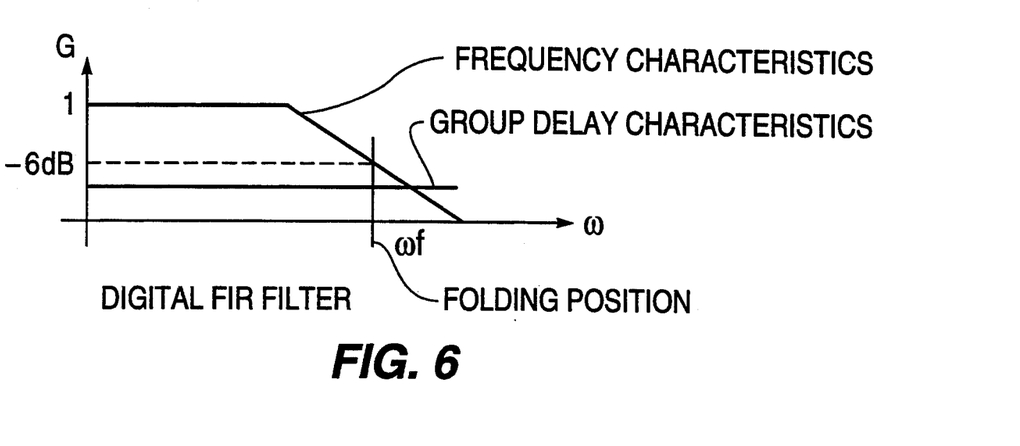
FIG. 6 shows the frequency and group delay characteristics of the digital low-pass filter in FIG. 4, which filter defines the baseband in which the folded-spectrum luminance signal is contained and is a finite-impulse-response filter with a symmetrical kernel, thus being a linear-phase filter.

FIG. 6 shows that the digital low-pass filter 216 exhibits a constant group delay characteristic throughout the full frequency bandwidth. This is characteristic of any finite-impulse-response (FIR) filter with a symmetrical kernel, and results in a linear-phase response. The digital low-pass filter 216 is designed to be this type of digital filter in order to exploit in a specific manner these generally known characteristics. In the preferred embodiment of their invention referred to above, the inventors have used a 31-tap FIR filter providing a Hamming-window response and having a −3 dB corner frequency at 2.55 MHz as the digital low-pass filter 216. The −3 dB roll-off of the 31-tap FIR filter at 2.55 MHz augments the approximately −3 dB roll-off of the tape reproduction system at that frequency, to cause approximately a −6 dB roll-off at the 2.55 MHz folding frequency. This −6 dB roll-off is at the higher-frequency end of both the normal frequency spectrum of lower luminance frequencies and the reversed spectrum of higher luminaninance frequencies translated to baseband in the folding procedure done prior to recording. In the unfolding procedure carried out during playback, the reversed spectrum is translated back to its original band and normal frequency order, to be −6 dB down at the 2.55 MHz folding frequency at its lower-frequency end. When the band of higher luminance frequencies is added to the baseband of lower luminance frequencies with a −6 dB roll-off at the 2.55 MHz folding frequency at its higher-frequency end, a full-bandwidth spectrum results that is close to being flat in the vicinity of 2.55 MHz.

What is claimed is:

1. A method for reproducing a full-bandwidth video signal from a frequency-modulation signal, said frequency-modulation signal being such as results from a folded-spectrum video signal of reduced-bandwidth being used to modulate the frequency of a frequency-modulation carrier wave, said folded-spectrum video signal being such as results from a bandwidth compression technique of frequency folding said full-bandwidth video signal, said method comprising the steps of:

converting said frequency modulation signal in analog form to a pulse-position-modulation signal in analog form, said pulse position signal comprising a baseband component corresponding to said folded-spectrum video signal of reduced-bandwidth, harmonics of said frequency-modulation carrier wave and frequency-modulation sidebands of said harmonics of said frequency-modulation carrier wave;

digitizing at a prescribed sampling rate the analog signal that is the response of a preliminary step of filtering said pulse-position-modulation signal in analog form, to suppress components thereof of frequencies higher than half said prescribed sampling rate, and to maintain a constant group delay characteristic throughout a frequency band in which said folded-spectrum video signal is included; and digitally filtering the response of said step of digitizing, to suppress the harmonics of said frequency-modulation carrier wave and said frequency-modulation sidebands of said harmonics of said frequency-modulation carrier wave, and to maintain a constant group delay characteristic throughout the band in which said folded-spectrum video signal is included.

2. A method for reproducing a full-bandwidth video signal from a frequency-modulation signal, as set forth in claim 1, used as steps in a method for reproducing a full-bandwidth video signal from a frequency-modulation signal recorded in a recording medium, which steps are preceded by a preliminary step of:

reproducing said frequency-modulation signal by playing back from said recording medium.

3. A method for reproducing a full-bandwidth video signal from a frequency-modulation signal, as set forth in claim 1, wherein said step of filtering said pulse-position-modulation signal in analog form is carried out maintaining a substantially flat amplitude response characteristic and accompanying linear phase characteristic throughout the band in which said folded-spectrum video signal is included.

4. A method reproducing a full-bandwidth video signal from a frequency-modulation signal, as set forth in claim 1, wherein said step of digitally filtering is carried out using a finite-impulse-response, low-pass, digital filter.

5. A method for reproducing a full-bandwidth video signal from a frequency-modulation signal, said frequency-modulation signal being modulated in accordance with a folded-spectrum video signal of a type generated by a bandwidth compression technique of frequency folding the upper half of the frequency spectrum of said full-bandwidth video signal around a prescribed folding frequency so as to occupy a same frequency band as occupied by the lower half of the frequency spectrum of said full-bandwidth video signal, said method comprising the steps of:

demodulating said frequency-modulation signal to generate a demodulation result;

digitizing only a low-pass component portion of said demodulation result to generate a first stream of digital samples occuring at a prescribed sampling rate, said low-pass component portion of said demodulation result being generated by a preliminary step of filtering in the analog regime so as to suppress essentially only a high-pass component portion of said demodulation result as would otherwise give rise to aliases when digitizing at said prescribed sampling rate; and digitally filtering said first stream of digital samples to generate a second stream of digital samples descriptive of a reproduced folded-spectrum video signal, components higher in frequency than said reproduced folded-spectrum video signal being suppressed in said second stream of digital samples; and generating a reproduced full-bandwidth video signal by unfolding said reproduced folded-spectrum video signal.

6. A method for reproducing a full-bandwidth video signal from a frequency-modulation signal, as claimed in claim 5, wherein, over a range of frequencies up to said prescribed folding frequency, said low-pass component portion of said demodulation result is processed with a constant group delay characteristic and substantially no roll-off of amplitude response characteristic.

7. A method for reproducing a full-bandwidth video signal from a frequency-modulation signal, as set forth in claim 6, used as steps in a method for reproducing a full-bandwidth video signal from a frequency-modulation signal recorded in a recording medium, which steps are preceded by a preliminary step of:

reproducing said frequency-modulation signal by playing back from said recording medium.

8. A method for reproducing a full-bandwidth video signal from a frequency-modulation signal, as set forth in claim 5, used as steps in a method for reproducing a full-bandwidth video signal from a frequency-modulation signal recorded in a recording medium, which steps are preceded by a preliminary step of:

reproducing said frequency-modulation signal by playing back from said recording medium.

9. An apparatus for reproducing a full-bandwidth video signal from a frequency-modulation signal played back from a recording medium, said frequency-modulation signal being modulated in accordance with a folded-spectrum video signal of a type generated by a bandwidth compression technique of frequency folding the upper half of the frequency spectrum of said full-bandwidth video signal around a prescribed folding frequency so as to occupy the same band as the lower half of the frequency spectrum of said full-bandwidth video signal, said apparatus comprising:

analog reproducing means including
a demodulator for demodulating said frequency-modulation signal to generate a demodulation result and
an analog anti-aliasing filter for providing a low-pass response with a cut-off frequency below one-half a prescribed sampling rate; and
digital reproducing means including
an analog-to-digital converter for digitizing the low-pass response of said anti-aliasing filter supplied as an output signal from said analog reproducing means thereby to generate a first stream of digital samples occurring at said prescribed sampling rate,
a digital filter for selecting from said first stream of digital samples a second stream of digital samples descriptive of a reproduced folded-spectrum video signal, and
means for unfolding said reproduced folded-spectrum video signal to generate said reproduced full-bandwidth video signal.

10. An apparatus for reproducing a full-bandwidth video signal from a frequency-modulation signal played back from a recording medium, as claimed in claim 9, wherein said digital filter essentially consists of a finite-impulse-response low-pass filter having a cut-off frequency substantially equal to the folding frequency.

11. An apparatus for reproducing a full-bandwidth video signal from a frequency-modulation signal played back from a recording medium, including in addition to apparatus as claimed in claim 10:

a transport for playing back, from said recording medium, said transport including at least one playback head for supplying said frequency-modulation signal, as played back from said recording medium.

12. An apparatus for reproducing a full-bandwidth video signal from a frequency-modulation signal played back from a recording medium, including in addition to apparatus as claimed in claim 9:

a transport for playing back from said recording medium, said transport including at least one playback head for supplying said frequency-modulation signal, as played back from said recording medium.

13. An apparatus for reproducing from a frequency-modulation signal an original full-bandwidth video signal with an original wide bandwidth extending from zero frequency up to a roll-off frequency, said frequency-modulation signal being such as results from a folded-spectrum video signal of reduced-bandwidth being used to modulate the frequency of a frequency-modulation carrier wave, said folded-spectrum video signal being such as results from a bandwidth compression technique of frequency folding said original full-bandwidth video signal around a prescribed folding frequency, said apparatus comprising:

a frequency-modulation demodulator for generating, responsive to said frequency-modulation signal being supplied thereto for demodulation, a pulse-position-modulation output signal containing in a baseband thereof a replica of said folded-spectrum video signal of reduced-bandwidth and further containing harmonics of said frequency-modulation carrier wave and frequency-modulation sidebands of said harmonics of said frequency-modulation carrier wave;

an analog-to-digital converter for generating at a prescribed sampling rate digitized samples descriptive of an analog signal supplied thereto as input signal;

an anti-aliasing filter for responding to the output signal of said frequency-modulation demodulator to generate the analog signal supplied as input signal to said analog-to-digital converter;

a digital filter connected for responding to the digitized samples generated at a prescribed sampling rate by said analog-to-digital converter to supply as an output signal from said digital filter digitized samples of the replica of said folded-spectrum video signal of reduced-bandwidth without accompanying response to said harmonics of said frequency-modulation carrier wave and said frequency-modulation sidebands of said harmonics of said frequency-modulation carrier wave; and a decoder for generating a replica of the original full-bandwidth video signal, responsive to the digitized samples of the the output signal supplied from said digital filter.

14. An apparatus for reproducing a full-bandwidth video signal from a frequency-modulation signal played back from a recording medium, including in addition to apparatus as claimed in claim 13:

a transport for playing back from said recording medium, said transport including at least one playback head for supplying said frequency-modulation signal, as played back from said recording medium.

15. An apparatus for reproducing a full-bandwidth video signal from a frequency-modulation signal played back from a recording medium, as set forth in claim 13 wherein said frequency-modulation demodulator is of a type in which both positive-going and negative-going crossings of the average-value axis of the frequency-modulation signal are detected and a pulse-position-modulation signal is generated as the output signal of said frequency-modulation demodulator.

16. An apparatus for reproducing a full-bandwidth video signal from a frequency-modulation signal played back from a recording medium, including in addition to apparatus as claimed in claim 15:

a transport for playing back from said recording medium, said transport including at least one playback head for supplying said frequency-modulation signal, as played back from said recording medium.

17. An apparatus for reproducing a full-bandwidth video signal from a frequency-modulation signal played back from a recording medium, as set forth in claim 13, wherein said digital filter is a finite-impulse-response low-pass filter having a cut-off frequency equal to the folding frequency.

18. An apparatus for reproducing a full-bandwidth video signal from a frequency-modulation signal played back from a recording medium, including in addition to apparatus as claimed in claim 17 played back from a recording medium:

a transport for playing back from said recording medium, said transport including at least one playback head for supplying said frequency-modulation signal, as played back from said recording medium.

* * * * *